April 3, 1928.  G. F. ZAUN  1,664,724

STAIRS

Filed May 5, 1926

INVENTOR,
George F. Zaun;
BY Blakeslee Brown
ATTORNEYS.

Patented Apr. 3, 1928.

1,664,724

UNITED STATES PATENT OFFICE.

GEORGE F. ZAUN, OF SAN BERNARDINO, CALIFORNIA.

STAIRS.

Application filed May 5, 1926. Serial No. 106,943.

This invention relates to improvements in stairs, and particularly to improvements which have a direct application to rolling stock. At the present time it is customary in the case of Pullman coaches to provide a stool which is placed upon the ground so that a passenger may readily descend or ascend to the first step of the Pullman coach. Coaches of the Pullman type have at both ends a platform which carries steps and likewise trap doors adapted to be swung over said steps as well as main doors that close the entrance openings. When the main door of an entrance opening is closed the trap door is maintained closed over the steps. This is a safety precaution so that passengers will not fall from the train when the train is in movement, and furthermore, it prevents tramps or other unauthorized persons from entering the different cars at various stops. In order to permit entrance or discharge of passengers the main door is opened, whereupon the trap door may be opened to permit passengers to ascend or descend from the steps on to a stool, and thence to the ground, or vice versa.

The present invention does away with the necessity of providing a stool, by providing a step which is swingingly or pivotally united to the steps in such a manner that when the trap door is lifted or opened, the last named step will swing downwardly into a position which renders ascending or descending from the coach an easy matter, and does away with the stool. Furthermore, the invention is novel in that this step which is used in conjunction with the other steps will fold inwardly and close entrance to the steps so that tramps or others cannot ride upon the steps and beneath the trap door, and furthermore, snow is prevented from gathering upon the steps during inclement weather.

The invention has for an object the provision of an improved device which is adapted for use on rolling stock in conjunction with the stairs thereof, which invention is superior in point of relative simplicity and inexpensiveness, taken in conjunction with utility, durability and general efficiency and serviceability.

With the above and other objects in view, the invention consists in the novel and useful provision, formation, construction, association and relative arrangement of parts, members and features, all as shown in the drawing, described generally, and finally pointed out in claims.

In the drawing.

Corresponding parts in all the figures are designated by the same reference characters.

Figure 1:
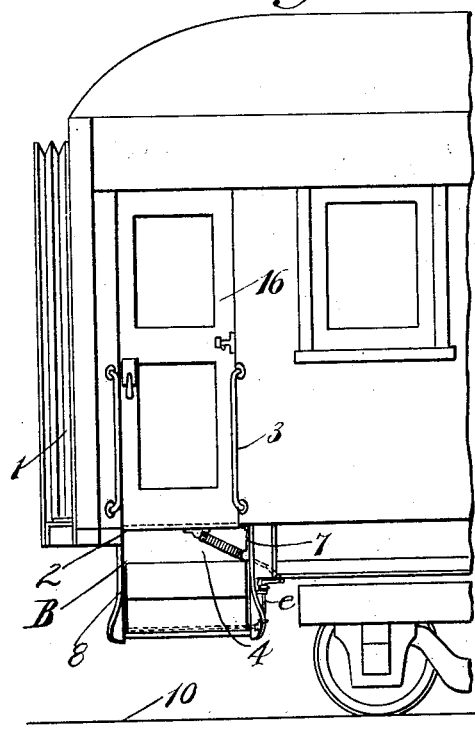
Figure 1 is a fragmentary side elevation of a Pullman coach, the stairs of which incorporate the invention.

Referring with particularity to the drawing, the Pullman coach is designated by A and the improved stairs by B. The stairs may be considered either as a separate entity independent of the Pullman coach, or the invention may be considered in certain other aspects as an attachment for existing stairs on said coaches. Furthermore, within the purview of the invention my improved device may be applied as a unitary member adaptable for coaches independent of any other stairs.

Figure 2:
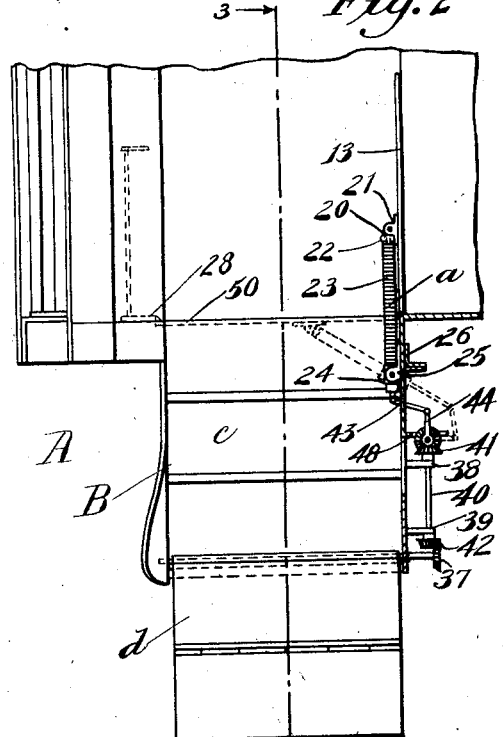
Figure 2 is a sectional view on the line 2—2 of Figure 3.
Figures 3, 4:
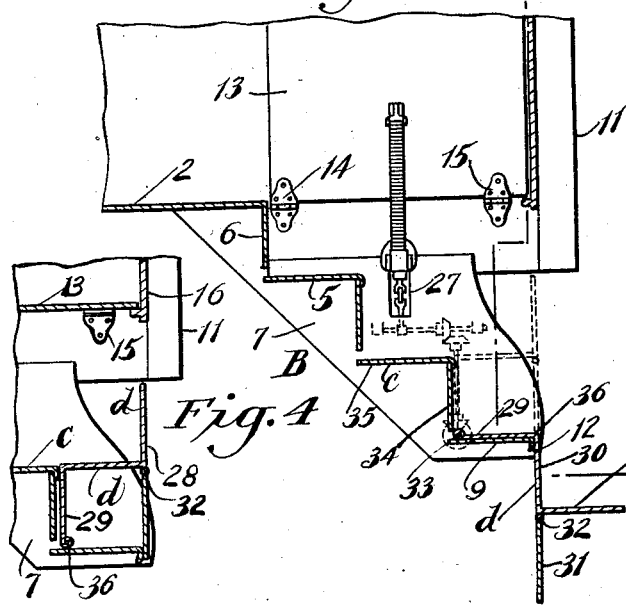
Figure 3 is a cross sectional view on the line 3—3 of Figure 2.
Figure 4 is a fragmentary sectional view showing a collapsed condition of the stairs.
Figure 5:
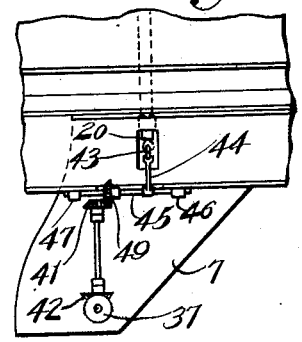
Figure 5 is a detail of the operating mechanism used in the invention.

At both ends of a coach such as the Pullman coach type or any other railroad coach having a vestibule part 1, the rear platform as well as the front platform 2 have entrance portions 3. The platform on both front and rear is provided with a stairway 4 consisting of treads 5, and risers 6, both the treads and the risers being supported between side members 7 and 8. Usually the lowermost step 9 is some distance from the surface of the ground or the top of a rail 10, and for this reason it is customary to provide a stool for passengers to step upon. It is not desired that railroad coach steps should protrude outwardly from the car sides and for that reason the lowermost step is usually approximately in alignment with the outer side wall of the coach. This is shown in Figure 3, wherein the side wall is shown at 11, and the nosing of the lowermost step at 12. This construction materially shortens the transverse width of the platform 2. To overcome this shortening of the platform and to render the coaches safe for the passengers, a trap door 13 is provided which is adapted to close over the said stairs and form a substantially flush surface with the platform 2 when so closed. The platform is hinged as shown at 14 and 15 to an end wall of the coach. When the trap door forms a continuation of the platform 2, an outside door 16 is adapted to close over the trap door and to effectively prevent entrance to the coach or to prevent anyone from leaving the coach at such a position, and so long as the door at 16 is closed the trap door 13 cannot be raised. When it is desired to discharge or permit the entrance of passengers to or from the coach, the door 16 is opened, whereupon the trap door may be lifted, upon releasing the catch 28, into an upright position against an end wall of the coach, as illustrated in Figure 2. This trap door is maintained in an upright position by a catch, and assistance in lifting the trap door is provided through the medium of a device designated as an entirety by $a$. This device includes a rod 20 pivoted to a bracket 21, which bracket in turn is secured to the bottom surface of the trap door 13. One end of the rod is headed as shown at 22 and coiled about the rod is a spring 23. A collar 24 is pivoted to a bracket 25, which bracket is secured to the member 7 of the stairs, as shown at 26, and the said collar acts to confine the end of the spring 23, and the said rod 20 extends through said collar. When the trap door is in the position shown in Fig. 1, the rod will extend through the collar 24 and the spring 23 will be compressed as between the collar 24 and the head 22 of the rod. The side 7 of the stairs is slotted at 27 so as to accommodate this swinging movement of the free end portion of the rod.

It will be noted that when the trap door is down that a releasable catch indicated in dotted lines at 28 holds the trap door. Upon releasing the catch 28 the trap door is easily lifted, being assisted by the spring 23, the spring tending to expand and act in a measure as a counter balance to the weight of the trap door.

The stairs B in the present instance will include the ordinary stairway, as previously described, and designated herein as $c$ plus the auxiliary stairs $d$. The step $d$ is substantially Z-shaped having two treads 28 and 29, with an intermediate and connecting riser 30. Pivoted beneath the tread 28 and in substantial alignment with the riser 30 is an apron 31 pivoted to such auxiliary step at 32. The tread 29 is formed with hinge knuckles 33 whereby the same may be pivoted between the sides 7 and 8 of the staircase, with a hinge pin or shaft 36 passed through said knuckles maintaining the knuckles adjacent the riser 34 between the lowermost tread 9 and the next tread 35 there-above.

It will be seen that the angular portion 36 between the tread 29 and the riser 30 lies adjacent the nosing 12, and that in Figure 3 the tread 29 is adapted to rest upon the tread 9. When the auxiliary step is in the position shown in Figure 3 the apron 31 will hang downwardly. When the auxiliary step is revolved about its hinge connection with the staircase sides the tread 28 will extend straight upwardly and the apron will lie in substantially the same vertical plane therewith, as shown in Figure 4, the said apron 31 abutting against the nosing 12. The two positions for the said auxiliary stairs are shown in Figures 3 and 4. As likewise constituting a portion of the means B, is means $e$ for revolving the auxiliary stairs $d$ into a collapsed or closed position, illustrated in Figure 4, or into an open position, as in Figure 3, depending upon whether the trap door 13 is open or closed. It is intended that when the trap door is closed, as for instance illustrated in Figs. 1 and 4, that the auxiliary stairs should likewise be in its closed or collapsed condition and so remain until the trap door is raised. The means $e$ may assume various forms, and in the present instance the shaft 36 passed through the knuckles 33 is secured to said knuckles so that it will revolve with the auxiliary stairs. Carried on the said shaft is a bevel gear 37. A pair of bearing brackets 38 and 39 act to support and carry a shaft 40, there being beveled gears 41 and 42 at ends of said shaft, the bevel gear 42 meshing with the teeth of the bevel gear 37. Hingedly secured to an end of the rod 20 is an arm 43, and this arm 43 in turn is pivotally secured to an arm 44. The arm 44 is keyed or otherwise secured to a shaft 45, which shaft is carried in bearing brackets 46 and 47, the bearing brackets being secured to an extension 48 on the side 7. Carried on the shaft 45 is a bevel gear 49 in mesh with the bevel gear 41. It will be seen that the shaft 45 is at right angles to the shaft 36 and that the shaft 40 acts as a jack or intermediate shaft between the two shafts 36 and 45. When the trap door is raised from the dotted position of Figure 2 at 50 the arm 20 will move from the dotted position shown in Figure 2 to the full line position of said figure, and revolve the arm 44 approximately through a 90 degree arc, and this revolution will revolve the auxiliary stairs from the dotted position of Figure 3 to the full line position of said figure. When the trap door is lowered the opposite effect takes place, namely, the arm 44 is revolved to the dotted position of Figure 2 and the auxiliary stairs are raised to the dotted position of Figure 3. As a consequence and as Figure 2 shows, it is unnecessary to use a stool, as the stairs perform the office of the stool in a more satisfactory manner, as the stairs are wider, corresponding to the width of the remaining stairs. Actual support of the auxiliary stairs is of course carried by the lowermost tread 9 and the apron will effectively tend to prevent snow, mud or any extraneous substance from resting upon the tread of the stairs 9 which might prevent proper operation of the auxiliary stairs $d$, and furthermore, tramps or unauthorized persons are prevented from riding on said stairs when the trap door is down by the apron plus the tread 28, obstructing entrance thereto.

It is obvious that various changes and modifications may be made in practicing the invention, in departure from the particular showing of the drawing, without departing from the true spirit of the invention.

Having thus disclosed my invention, I claim and desire to secure by Letters Patent:

1. In a railroad coach having a platform, a stairway associated with the platform, and a trap door adapted to be swung upwardly or downwardly to uncover or cover said stairway and form an extension to said platform, the combination with said stairway, of an auxiliary stairway hingedly secured to said first stairway, and means between the trap door and said auxiliary stairway whereby movement of the trap door will swing the auxiliary stairway upwardly or downwardly relative to the first stairway; said auxiliary stairway being provided with an apron and said apron being adapted to swing against the tread of the lowermost stair when the auxiliary stairway is in an upward position.

2. In a device of the character disclosed, a stairway, an auxiliary stairway having a tread adapted to rest when in one position upon the tread of the first stairway, and to be swung from said first position to a position substantially vertical with relation to the tread of the first stairway.

3. In a device of the character disclosed, a stairway, an auxiliary stairway having a tread adapted to rest when in one position upon the tread of the first stairway, and to be swung from said first position to a position substantially vertical with relation to the tread of the first stairway; a door normally closing entrance to said first stairway, and means of connection between the said door and the auxiliary stairway whereby when the door is open one tread of the auxiliary stairway rests upon the lowermost tread of the first mentioned stairway.

In testimony whereof, I have signed my name to this specification.

GEORGE F. ZAUN.